(12) United States Patent
Tasey

(10) Patent No.: US 7,677,620 B1
(45) Date of Patent: Mar. 16, 2010

(54) DISC RETRIEVING APPARATUS

(76) Inventor: Matt A. Tasey, 4901 Hope La., Sacramento, CA (US) 95821

( * ) Notice: Subject to any disclaimer, the term of this patent is extended or adjusted under 35 U.S.C. 154(b) by 27 days.

(21) Appl. No.: 12/027,510

(22) Filed: Feb. 7, 2008

(51) Int. Cl.
*B25J 1/02* (2006.01)
*A01D 7/06* (2006.01)

(52) U.S. Cl. .................................. 294/19.1; 56/400.19

(58) Field of Classification Search ................ 294/19.1, 294/19.2, 53.5, 66.1; 56/400.19, 400.2, 400.21
See application file for complete search history.

(56) References Cited

U.S. PATENT DOCUMENTS

| | | | | |
|---|---|---|---|---|
| 2,738,214 | A * | 3/1956 | Zimmers | 294/19.2 |
| 3,976,564 | A * | 8/1976 | Holder | 209/38 |
| 4,212,150 | A * | 7/1980 | Dmochowski | 56/400.06 |
| 4,635,987 | A | 1/1987 | Hurtgam | |
| D333,857 | S | 3/1993 | Schropp | |
| 5,311,733 | A * | 5/1994 | Krenkel | 56/400.06 |
| 5,511,841 | A | 4/1996 | Allen | |
| 5,555,711 | A * | 9/1996 | Costa | 56/400.2 |
| 5,720,159 | A * | 2/1998 | Dee | 56/400.18 |
| 5,743,578 | A * | 4/1998 | Schuermann | 294/19.2 |
| 6,030,011 | A * | 2/2000 | Layton | 294/1.4 |
| D439,119 | S | 3/2001 | Colonello | |
| 6,223,759 | B1 | 5/2001 | Flippin, Jr. | |
| 6,694,717 | B1 * | 2/2004 | Dedrick | 56/400.04 |
| 6,705,654 | B2 | 3/2004 | Slauf | |
| 6,726,265 | B2 | 4/2004 | Miller | |
| 6,918,240 | B2 * | 7/2005 | Hurt | 56/400.19 |
| 6,922,888 | B2 | 8/2005 | Barry et al. | |
| 6,951,095 | B2 * | 10/2005 | Cusato | 56/400.04 |
| 7,017,234 | B2 | 3/2006 | Anderson | |
| 2006/0199682 | A1 | 9/2006 | Holms | |

* cited by examiner

*Primary Examiner*—Dean J Kramer

(57) ABSTRACT

A disc retrieving apparatus includes an elongated pole that has a first end and a second end. The pole is telescopic and is selectively extended into an engaged position or retracted into a stored position. A head is attached to the pole adjacent to the first end of the pole. The head includes a plate attached to the pole and a plurality of tines extending away from the plate. The tines are approximately coplanar with each other. Each of the tines has a distal end with respect to the plate. Each of a plurality of teeth is attached to one of the distal end. The teeth extend downwardly from a plane of the tines. The pole is extended to the engaged position as needed to retrieve an object from water with the head.

8 Claims, 4 Drawing Sheets

DISC RETRIEVING APPARATUS

BACKGROUND OF THE INVENTION

Field of the Invention

The present invention relates to object retrieving devices and more particularly pertains to a new object retrieving device for assisting a person in removing a throwing disc used for disc golf from a body of water such as a stream.

SUMMARY OF THE INVENTION

The present invention meets the needs presented above by generally comprising an elongated pole that has a first end and a second end. The pole is telescopic and is selectively extended into an engaged position or retracted into a stored position. A head is attached to the pole adjacent to the first end of the pole. The head includes a plate attached to the pole and a plurality of tines extending away from the plate. The tines are approximately coplanar with each other. Each of the tines has a distal end with respect to the plate. Each of a plurality of teeth is attached to one of the distal end. The teeth extend downwardly from a plane of the tines. The pole is extended to the engaged position as needed to retrieve an object from water with the head.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
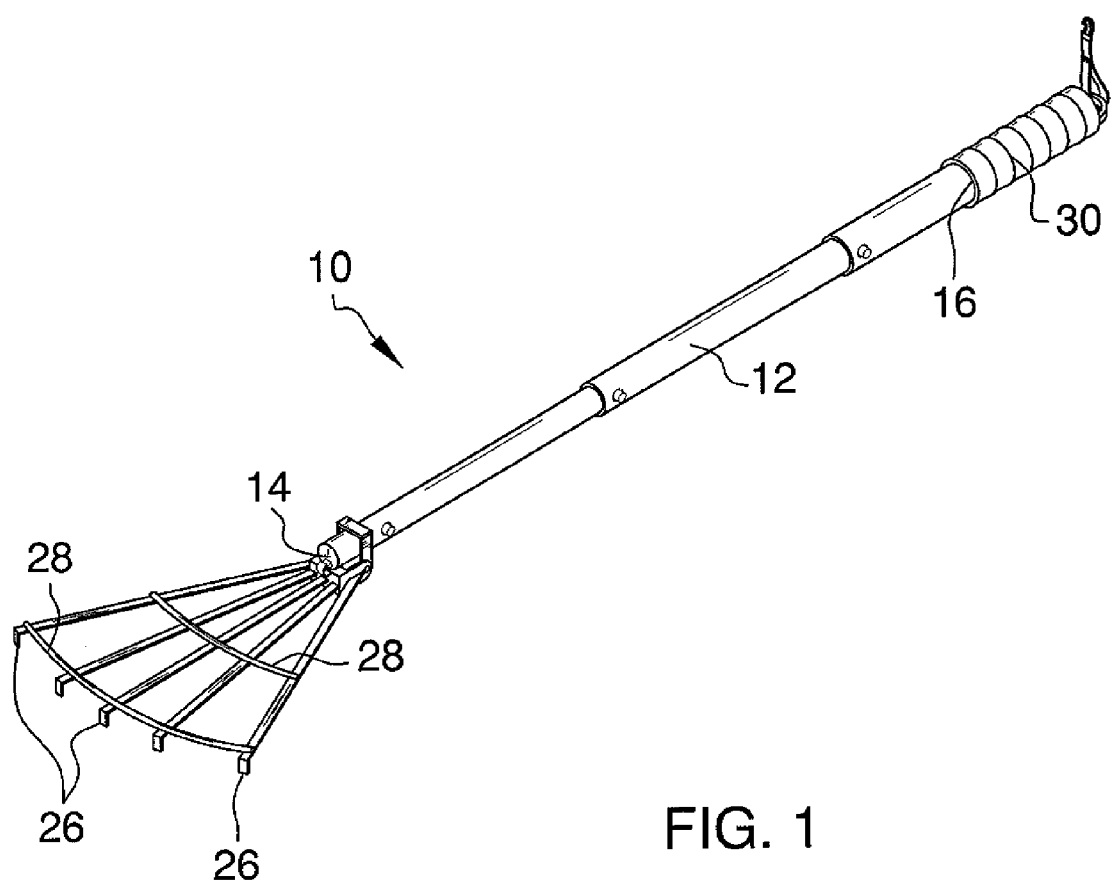
FIG. 1 is a top perspective view of a disc retrieving apparatus according to the present invention.

With reference now to the drawings, and in particular to FIGS. 1 through 6 thereof, a new object retrieving device embodying the principles and concepts of the present invention and generally designated by the reference numeral 10 will be described.

As best illustrated in FIGS. 1 through 6, the disc retrieving apparatus 10 generally comprises an elongated pole 12 has a first end 14 and a second end 16. The pole 12 is telescopic and is selectively extended into an engaged position or retracted into a stored position. The pole 12 has a length from the first end 14 to the second end 16 less than between 2.5 feet and 4 feet when the pole 12 in the engaged position and a length less than 2 feet when the pole 12 is in the stored position.

Figure 2:
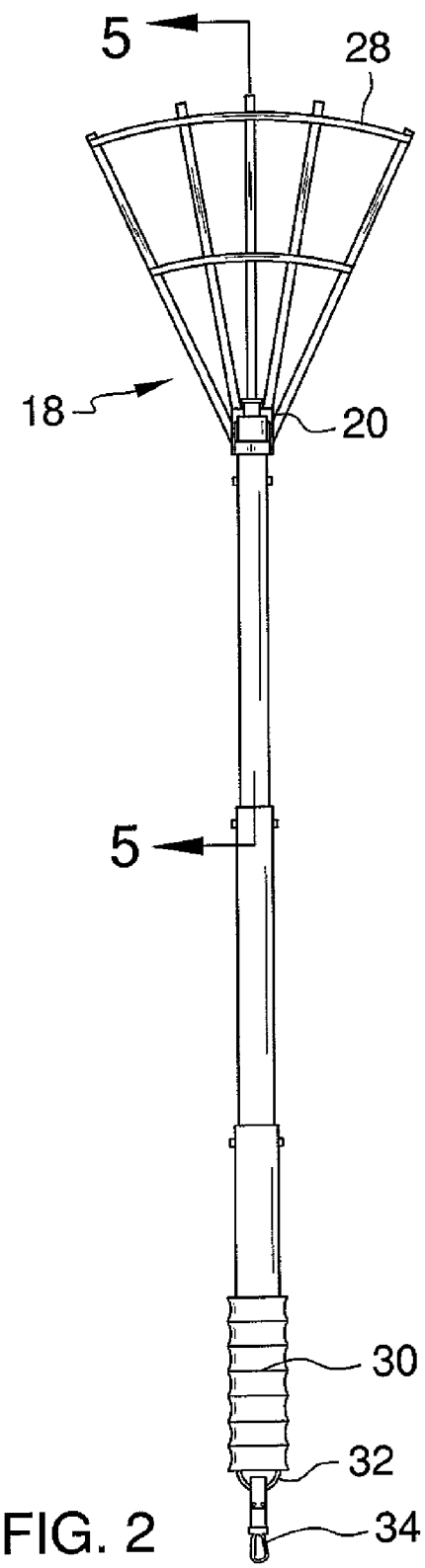
FIG. 2 is a top view of the present invention.
Figure 3:
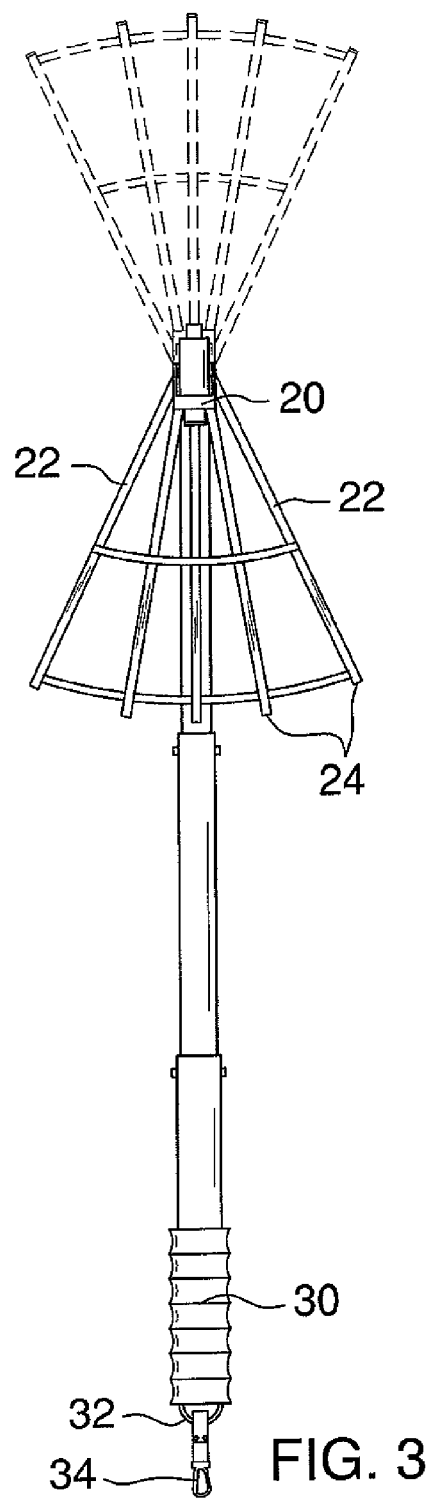
FIG. 3 is a bottom view of the present invention.
Figures 4, 5:
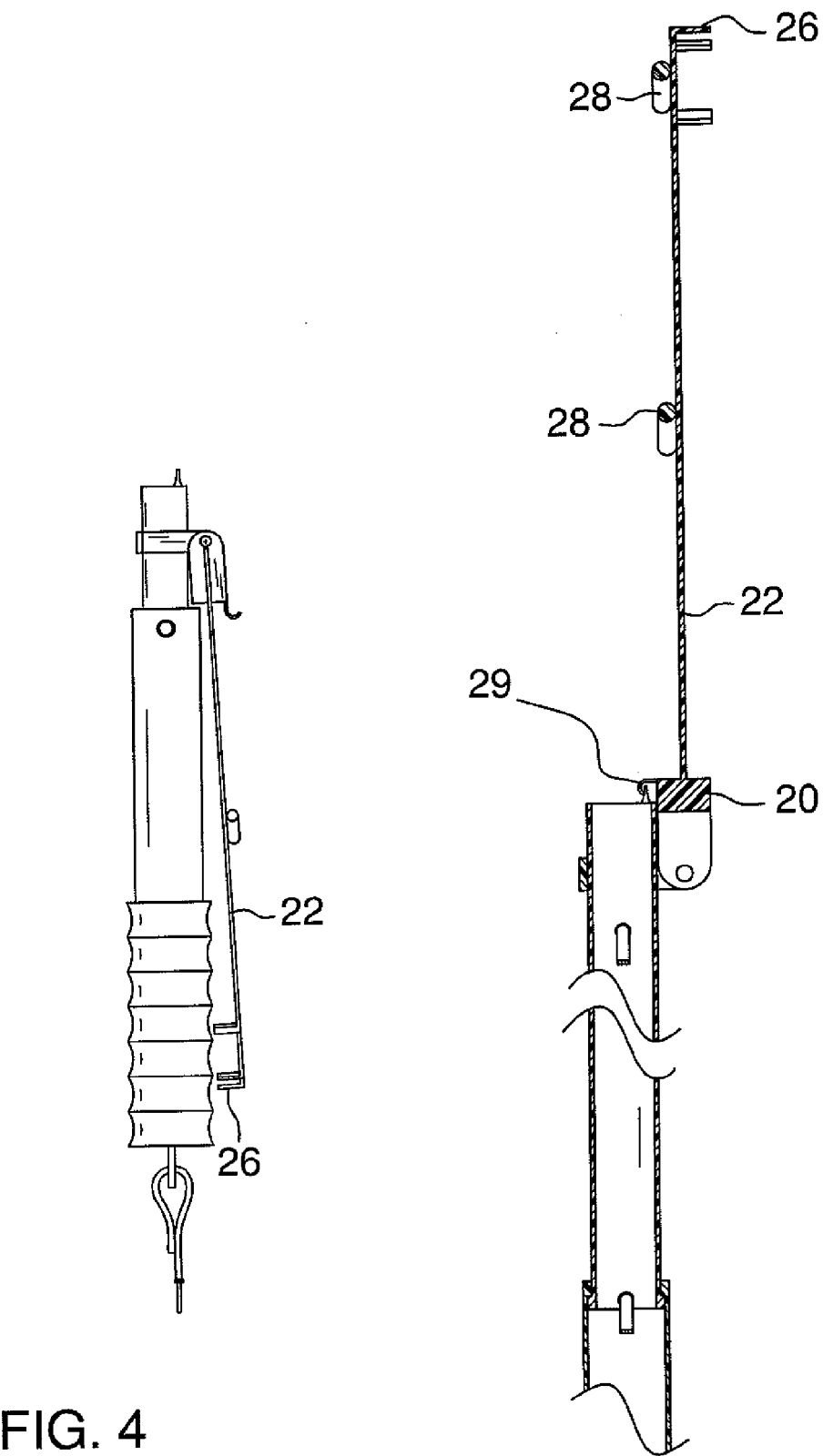
FIG. 4 is a side view of the present invention in a stored position.
FIG. 5 is a cross-sectional view of the present invention taken along line 5-5 of FIG. 2.
Figure 6:
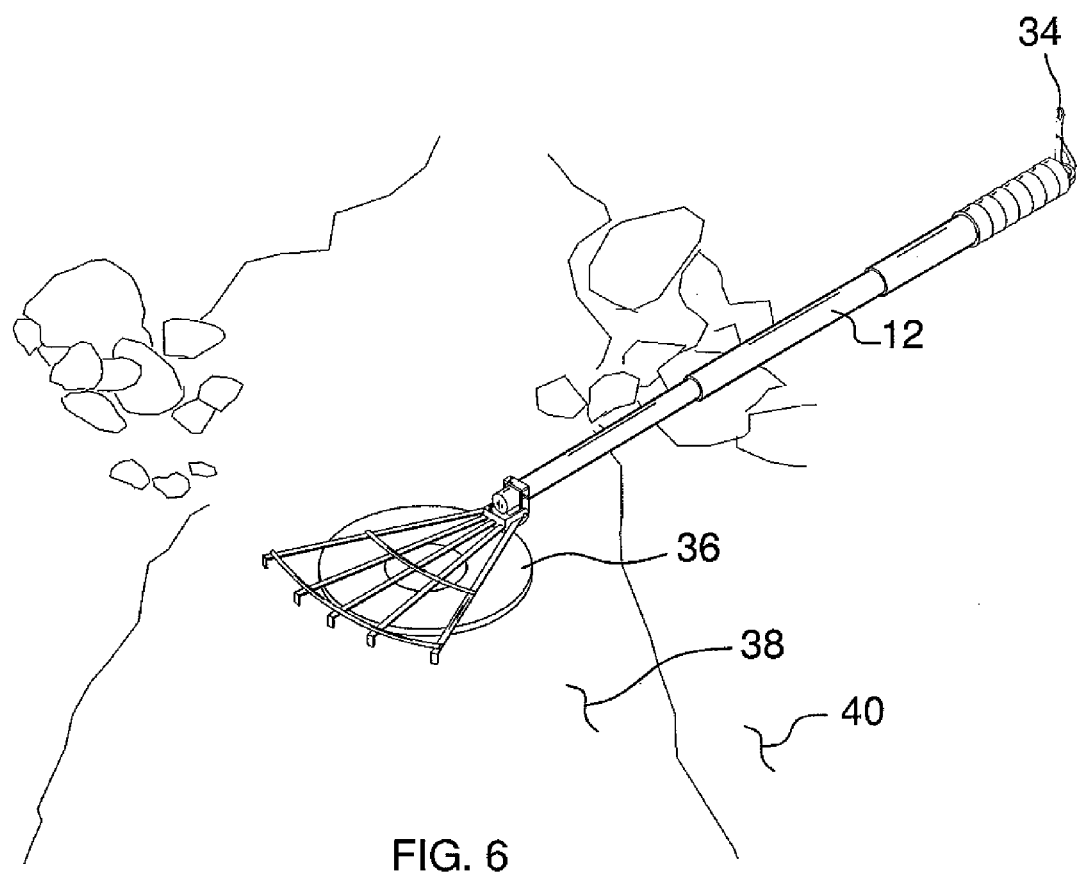
FIG. 6 is a perspective in-use view of the present invention.

A head 18 is attached to the pole adjacent to the first end 14 of the pole 12. The head 18 includes a plate 20 attached to the pole 12 and a plurality of tines 22 extending away from the plate 20. The tines 22 are approximately coplanar with each other. Each of the tines 22 has a distal end 24 with respect to the plate 20. Each of a plurality of teeth 26 is attached to one of the distal ends 24. The teeth 26 extend downwardly from a plane of the tines 22. The plate 20 is pivotally coupled to the pole 12 to allow the head 18 to be positioned in an extended position extending outwardly away from the first end 14 as shown in FIG. 2 or in a folded position folded back against the pole 12 and extending toward the second end 16 as shown in FIG. 3. The plate 20 abuts the pole 12 when the head 18 is in the extended position to prevent the plane of the tines 22 to move through a longitudinal axis of the pole 12. The longitudinal axis extends through the first 14 and second 16 ends. At least one support 28 is attached to each of the tines 22 and retains the tines 22 in planar alignment with each other. A catch 29 is attached to the plate 20 to retain the head 18 in the extended position.

A grip 30 is attached to the second end 16 of the pole 12 and a loop 32 is attached to the grip 30. A coupler 34 is attached to the loop 32 to allow the pole 12 to be coupled to an object. The coupler 34 may include a hook or clip.

In use, when a person wishes to retrieve and object, such as throwing disc 36 used for disc golf, the pole 12 is extended to the engaged position and the head positioned in the extended position. The apparatus 10 is then used to retrieve the disc 36 from a body of 38 by gripping it with the teeth 26 and dragging it onto shore 40. When not being used, the apparatus 10 easily collapses down to a size to allow it to be clipped on or positioned in a backpack or similar stowage.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A collapsible item retrieving tool apparatus for retrieving items out of water, said apparatus comprising:

an elongated pole having a first end and a second end, said pole being telescopic and being selectively extended into an engaged position or retracted into a stored position;

a head being attached to said pole adjacent to said first end of said pole, said head including a plate attached to said pole and a plurality of tines extending away from said plate, said tines being approximately coplanar with each other, each of said tines having a distal end with respect to said plate, each of a plurality of teeth being attached to one of said distal ends, said teeth extending downwardly from a plane of said tines;

said plate being pivotally coupled to said pole to allow said head to be positioned in an extended position extending outwardly away from said first end or in a folded position folded back against said pole and extending toward said second end of said pole, said plate abutting said pole when said head is in said extended position to prevent the plane of said tines to move through a longitudinal axis of said pole, said longitudinal axis extending through said first and second ends;

a catch being attached to said plate, said catch engaging said first end to retain said head in said extended position; and wherein said pole is extended to said engaged position to retrieve an object from water with said head.

2. The apparatus according to claim 1, wherein said pole has a length from said first end to said second end less than between 2.5 feet and 4 feet when said pole in said engaged position, said pole having a length less than 2 feet when said pole is in said stored position.

3. The apparatus according to claim 1, wherein at least one support is attached to each of said tines and retaining said tines in planar alignment with each other.

4. The apparatus according to claim 3, further including a grip being attached to said second end of said pole.

5. The apparatus according to claim 4, further including;
a loop being attached to said grip;
a coupler being attached to said loop to allow said pole to be coupled to an object.

6. The apparatus according to claim 1, further including a grip being attached to said second end of said pole.

7. The apparatus according to claim 6, further including;
a loop being attached to said grip;
a coupler being attached to said loop to allow said pole to be coupled to an object.

8. A collapsible item retrieving tool apparatus for retrieving items out of water, said apparatus comprising:

an elongated pole having a first end and a second end, said pole being telescopic and being selectively extended into an engaged position or retracted into a stored position, said pole having a length from said first end to said second end less than between 2.5 feet and 4 feet when said pole in said engaged position, said pole having a length less than 2 feet when said pole is in said stored position;

a head being attached to said pole adjacent to said first end of said pole, said head including a plate attached to said pole and a plurality of tines extending away from said plate, said tines being approximately coplanar with each other, each of said tines having a distal end with respect to said plate, each of a plurality of teeth being attached to one of said distal ends, said teeth extending downwardly from a plane of said tines, said plate being pivotally coupled to said pole to allow said head to be positioned in an extended position extending outwardly away from said first end or in a folded position folded back against said pole and extending toward said second end of said pole, said plate abutting said pole when said head is in said extended position to prevent the plane of said tines to move through a longitudinal axis of said pole, said longitudinal axis extending through said first and second ends, at least one support being attached to each of said tines and retaining said tines in planar alignment with each other;

a grip being attached to said second end of said pole;

a loop being attached to said grip;

a coupler being attached to said loop to allow said pole to be coupled to an object; and wherein said pole is extended to said engaged position and said head positioned in said extended position to retrieve an object from water.

* * * * *